(12) United States Patent
Cassell

(10) Patent No.: US 10,721,911 B2
(45) Date of Patent: Jul. 28, 2020

(54) DEVICE AND METHOD FOR ANIMAL SUSPENSION, IMMOBILIZATION, REHABILITATION, AND GROOMING

(71) Applicant: David Cassell, Blairsville, GA (US)

(72) Inventor: David Cassell, Blairsville, GA (US)

( * ) Notice: Subject to any disclaimer, the term of this patent is extended or adjusted under 35 U.S.C. 154(b) by 60 days.

(21) Appl. No.: 16/132,472

(22) Filed: Sep. 17, 2018

(65) Prior Publication Data

US 2019/0230898 A1 Aug. 1, 2019

Related U.S. Application Data

(60) Provisional application No. 62/625,055, filed on Feb. 1, 2018.

(51) Int. Cl.
*A01K 1/06* (2006.01)
*A01K 13/00* (2006.01)
*A01K 1/062* (2006.01)

(52) U.S. Cl.
CPC .......... *A01K 1/0613* (2013.01); *A01K 13/003* (2013.01); *A01K 1/062* (2013.01); *A01K 13/001* (2013.01)

(58) Field of Classification Search
CPC . A61D 3/00; A01K 1/035; A01K 1/04; A01K 1/0613; A01K 1/062; A01K 13/00; A01K 13/001; A01K 13/003; A01L 13/00
USPC ....... 119/712, 725, 728, 738, 740, 741, 749, 119/769, 774, 783
See application file for complete search history.

(56) References Cited

U.S. PATENT DOCUMENTS

| | | | |
|---|---|---|---|
| 3,208,432 A * | 9/1965 | Fisk | A01K 13/00 119/756 |
| 2009/0126650 A1* | 5/2009 | Walker-Indyke | A01K 13/001 119/601 |
| 2016/0057974 A1* | 3/2016 | McClain | A01K 15/04 119/725 |
| 2016/0106065 A1* | 4/2016 | Minze | A01K 13/00 248/440.1 |
| 2016/0338321 A1* | 11/2016 | Simons | A01K 13/001 |

* cited by examiner

*Primary Examiner* — William V Gilbert

(57) ABSTRACT

A device for immobilizing, grooming, and rehabilitating animals comprising: a beam, leg set assembly, crossbeam, suspension strap set, suspension strap clasps at the end of each suspension strap, cranking mechanism, hooking bar, and harness. The cranking mechanism comprises a lockable crank attaching to the first angle bracket, a pulley attaching to the beam at the beam midpoint, a hoist line, comprising a line and a first and second line end running through the pulley and connecting to the crank at the first line end, and a hoist hook attaching to the hoist line at the second line end.

9 Claims, 8 Drawing Sheets

DEVICE AND METHOD FOR ANIMAL SUSPENSION, IMMOBILIZATION, REHABILITATION, AND GROOMING

CROSS REFERENCE TO RELATED APPLICATIONS

This application claims the benefit of U.S. provisional application No. 62/625,055 filed on Feb. 1, 2018, the contents of which are hereby incorporated by reference.

TECHNICAL FIELD

The present disclosure relates to animal rehabilitation and grooming devices.

BACKGROUND

For thousands of years, humans have relied on animals for agriculture, transportation, and companionship. Grooming such animals is an important way to ensure their health and well-being. Grooming can even increase the lifespan of such animals since the owner is able to inspect the animal for external symptoms of various health conditions, such as rashes or cuts, and ensure that proper treatment is provided. The most common types of grooming include cutting the animal's nails and fur, cleaning ears, and washing the animal's body and legs.

One challenge in animal care is their resistance to being groomed. This poses a challenge to owners and professional groomers alike, who may be forced to sedate the animal. Existing solutions for restraining the animal during the grooming process includes strapping the neck or legs. Nonetheless, these and similar systems allow the animal to use the ground or table to jump, still making grooming difficult, if not impossible.

Another challenge in animal care is rehabilitation. Often, an animal will suffer from a broken limb or torn muscle etc. with which care will need to be taken in order not to put too much pressure on the given limb.

Therefore, it would be advantageous to provide a solution that would overcome the challenges noted above.

SUMMARY

The purpose of the summary section is to present some concepts of embodiments within the disclosure in a simplified form to provide the reader with the convenience of a basic understanding of some of the disclosure's embodiments. The summary is not an extensive overview of all contemplated embodiments. It is not intended to identify key elements of all embodiments and is not intended to delineate their scope.

Certain exemplary embodiments disclosed herein include an immobilization device comprising: a beam, comprising a first and second beam ends, a beam midpoint, and a first and second angle bracket attachment point, the first angle bracket attachment point falling between the beam midpoint and the first beam end, and the second angle bracket attachment point falling between the beam midpoint and the second beam end, a leg set assembly, comprising a first and second leg set, each leg set comprising: two legs, each leg having a top and bottom, a stabilization plate, comprising a triangular structure that joins the two legs at the tops and connects the tops to the respective first and second beam ends, with at least two legs attaching to each beam end, an angle bracket set, comprising at least four angle brackets, said angle bracket for connecting the stabilization plate of the first and second leg sets to the respective first and second angle bracket attachment points, a crossbeam, said crossbeam comprising two crossbeam ends and a crossbeam midpoint, said crossbeam attaching at the crossbeam midpoint to the beam at the beam midpoint, and a suspension strap set, comprising a first and second suspension strap attaching to the beam on opposite sides of the beam midpoint, and a third and fourth suspension strap attaching to the crossbeam on opposite sides of the crossbeam midpoint, and a suspension strap clasp at the end of each suspension strap. Certain exemplary embodiments disclosed herein additionally include a method of using the immobilization device, comprising: placing an animal in a harness, connecting the harness to a hooking bar by hooking attachment rings onto a lower hook set of the hooking bar, attaching a hoist hook to a center hook of the hooking bar, activating a motorized crank to elevate the animal in the harness, locking the crank at a desired height, clasping suspension strap clasps hanging from a beam onto a upper hook set of the hooking bar.

The present disclosure provides an immobilization device made of lightweight beams and poles, with strap attachments, hoisting apparatus, and harnessing to support and immobilize an animal. Also provided is a method of using the immobilization device.

Other objects, features, and advantages of the present disclosure will become apparent from the following detailed description. However, the detailed description and the specific examples, while indicating specific embodiments of the invention, are given by way of illustration only. Various changes and modifications within the spirit and scope of the invention will become apparent to those skilled in the art from this detailed description.

BRIEF DESCRIPTION OF THE DRAWINGS

The subject matter disclosed herein is particularly pointed out and distinctly claimed in the claims section of the specification. The claims as well as other objects, features, and advantages of the disclosed embodiments will be apparent from the following detailed description when taken in conjunction with the accompanying drawings.

DETAILED DESCRIPTION OF THE INVENTION

It is important to note that the embodiments described in this section are only examples of the many advantageous uses of the innovative teachings herein. Statements made herein do not necessarily limit any of the embodiments.

Some statements may apply to some inventive features but not to others. Singular elements may be expressed in plural and vice versa with no loss of generality unless otherwise indicated.

In the present disclosure, primary focus is on an immobilization device used as an animal rehabilitation aid and grooming aid by pet owners, animal breeders, veterinarians, and professional groomers. The immobilization device comprises, in essence, a beam with legs and straps, in addition to hoisting, harnessing, and hooking systems for holding an animal in place. Also provided herein is a method for using the immobilization device. This disclosure provides a solution for animal owners who require an affordable, lightweight, collapsible, and portable device and method to sufficiently immobilize an animal for grooming, bathing, administering medical care, rehabilitating, or disciplining without resorting to sedation.

Figure 1A:
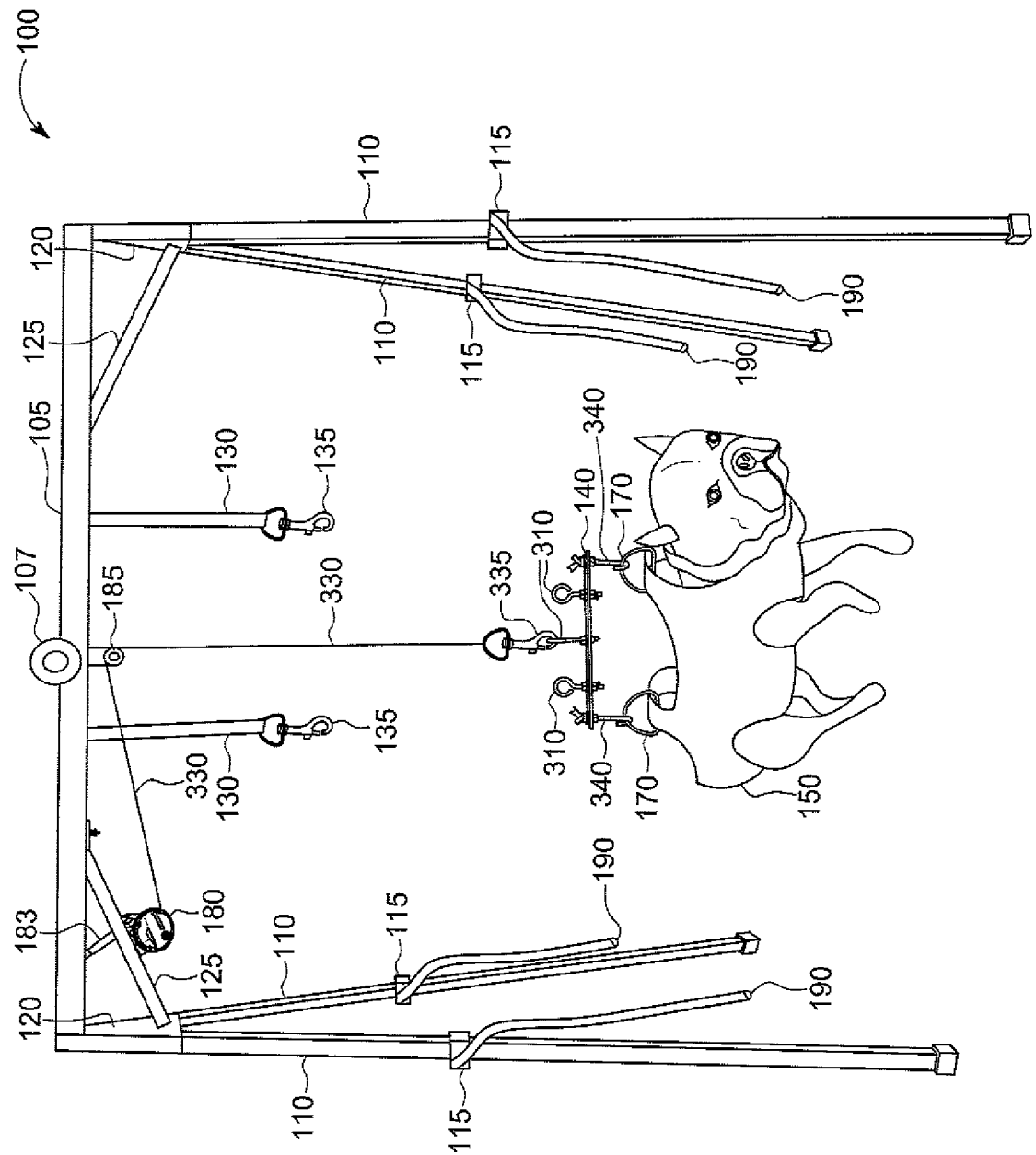
FIG. 1A is a front view illustrating an immobilization device using a harness according to an embodiment.

FIG. 1A is an exemplary embodiment of the immobilization device 100 comprising a beam 105, attaching thereto a perpendicular crossbeam 107, and two sets of legs 110 with height adjusters 115. A set of stabilization plates 120 and angle brackets 125 connect the leg sets to the beam 105. There are various straps and lines for suspending and stabilizing the animal, including suspension straps 130 with clasps 135, safety straps 190, and a hoist line 330 with a clasp 335. A hooking bar 140 provides an interface between the suspension straps 130, the safety straps 190, the hoist line 330, and the harness 150. The harness 150 holds the animal and connects to the hooking bar 140 through an attachment ring set 170. The attachment ring set 170 connects to the lower hook set 340 on the hooking bar 140. The animal can be hoisted using a lockable crank 180 by rotating a crank lever 183, which retracts the hoist line 330 through a pulley 185 centrally located beneath the beam and attached to the center of the beam via a chain. It is important to note that the crank lever 183 may be extended or inserted with larger rods to give the groomer enough leverage to hoist up the animal. In an alternative embodiment, the lockable crank 180 and crank lever 183 are motorized.

The hoist line 330 connects to the central hook of the upper hook 310 set by way of a hoist clasp 335. Once hoisted, the suspension straps 130 attach to the end hooks of the upper hook set 310 by way of the suspension strap clasps 135. Additional suspension straps (not shown) hang from the crossbeam 107 identical to the suspension straps 130 and suspension strap clasps 135 that hang from the beam 105, making it possible to rotate the animal 90 degrees in either direction, thereby making it easier for the groomer or veterinarian.

The safety straps 190 can attach to the end hooks of the lower hook set 340 or to the attachment ring set 170 for additional stability and safety. This embodiment makes it possible for the groomer to set the animal's height. For example, if the owner desires to clip the animal's nails, he may desire to have the animal more elevated. However, if the owner desires to give the animal a bath, then the owner would keep the animal lower.

In an additional embodiment, the legs may be modified for height adjustment by bifurcating each leg such that one half slides into or over the other and can be locked in place with height adjustors 115. In an embodiment the height adjustors 115 are hitch pins.

In an additional embodiment, wheels (not shown) are inserted at the bottom of each leg in order to transport the device 100. Additionally, the wheels can be used in a rehabilitative setting where the animal walks around in the harness moving the entire device 100 with him/her while limiting pressure on the animal's legs.

Figure 1B:
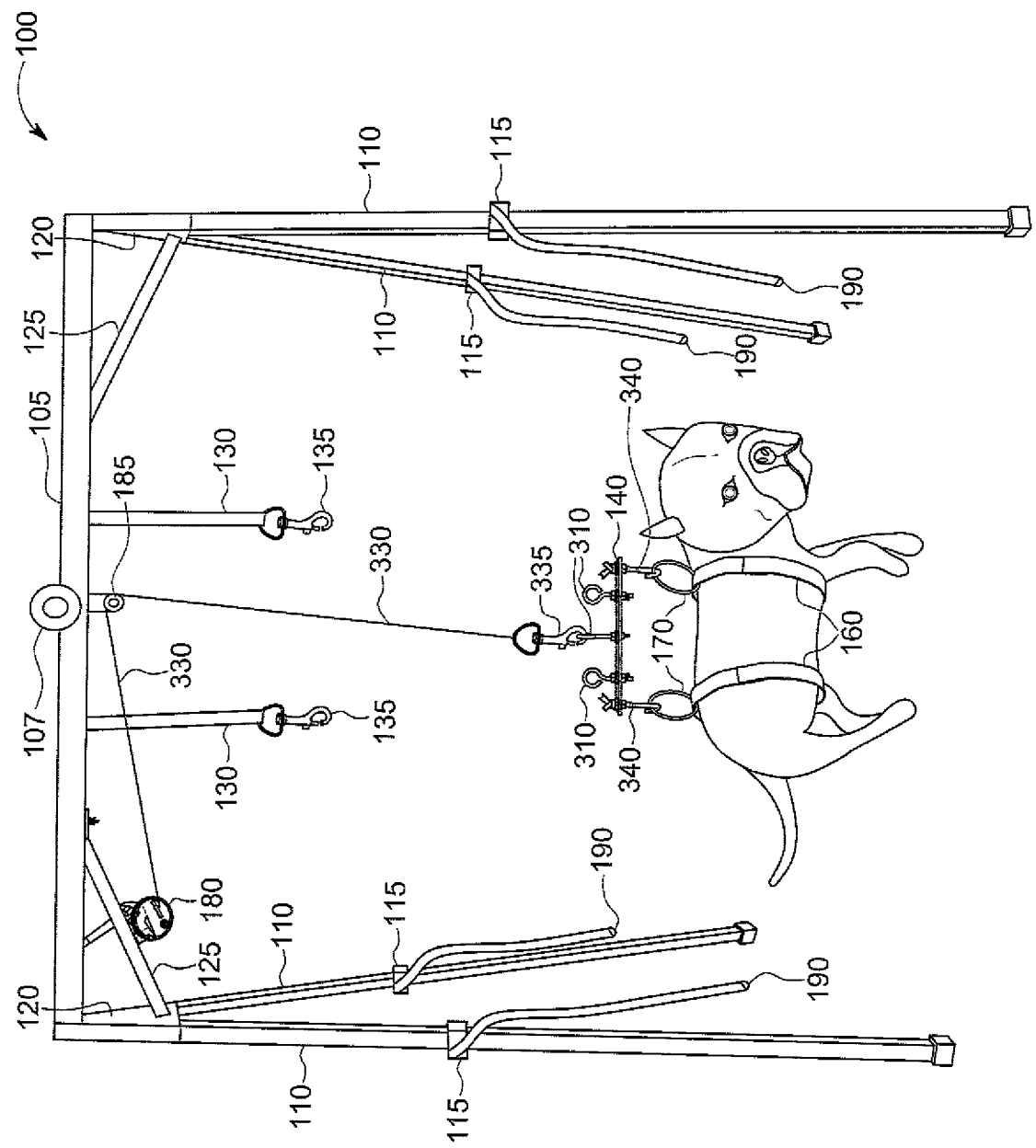
FIG. 1B is a front view illustrating an immobilization device using suspension belts according to an embodiment.

FIG. 1B shows an alternative embodiment of the immobilization device 100 wherein the animal is immobilized using a set of suspension belts 160 instead of the harness 150 of FIG. 1A. The suspension belts 160 wrap around the animal's abdomen and connect to the lower hook set 340 of the hooking bar 140 through the attachment ring set 170. Use of the suspension belts 160 would be optimal for bathing an animal because most of the animal's body remains exposed. In an embodiment, the set of suspension belts 160 are made of waterproof Velcro®. In an embodiment, only one suspension belt 160 on either the front or rear side of the animal as opposed to two. In another embodiment, three or more suspension belts 160 may be used for larger or longer animals.

Figure 1C:
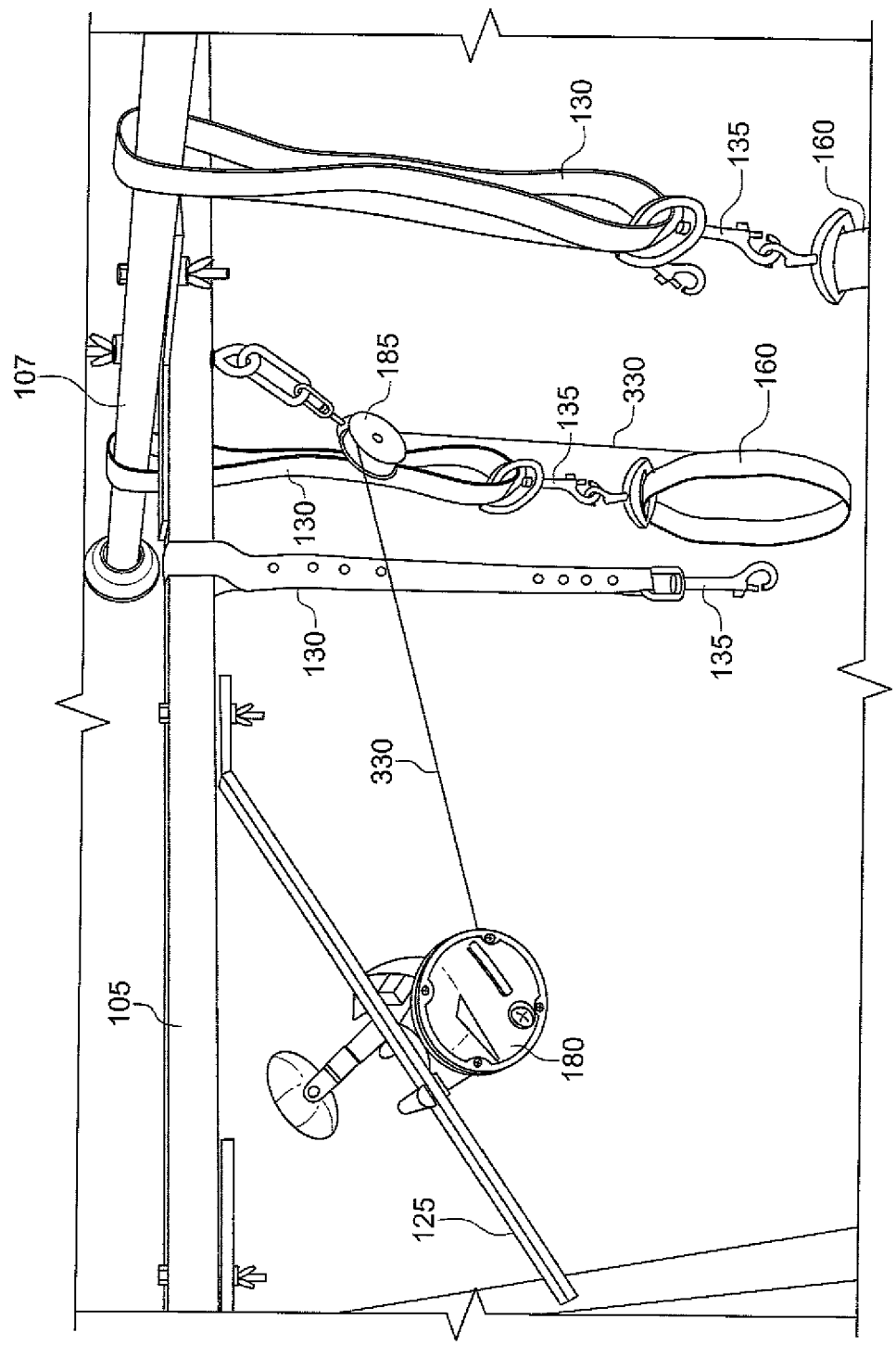
FIG. 1C is a close-up angled view of the upper portion of the immobilization device according to an embodiment.

FIG. 1C is an angled, close up view of the immobilization device 100 emphasizing the upper portion of the immobilization device 100 according to an embodiment. In this embodiment, the crossbeam 107 can accommodate the same set of straps 130 and hooking bar 140 as the horizontal beam 105. In an exemplary embodiment, suspension straps 130 and respective suspension strap clasps 135 are suspended from the perpendicular crossbeam 107 in order for the groomer to easily change the animal's orientation and groom other parts of the body without the groomer having to move to another side of the device and to switch from a harness to the suspension belts 160 and vice versa. Additionally, another set of suspension belts 160 may be secured to the suspension strap clasps 135 under the crossbeam 107 in order for the animal to be transferred from the harness 150 to the belts 160 without having to lower the animal to ground level.

Figure 2:
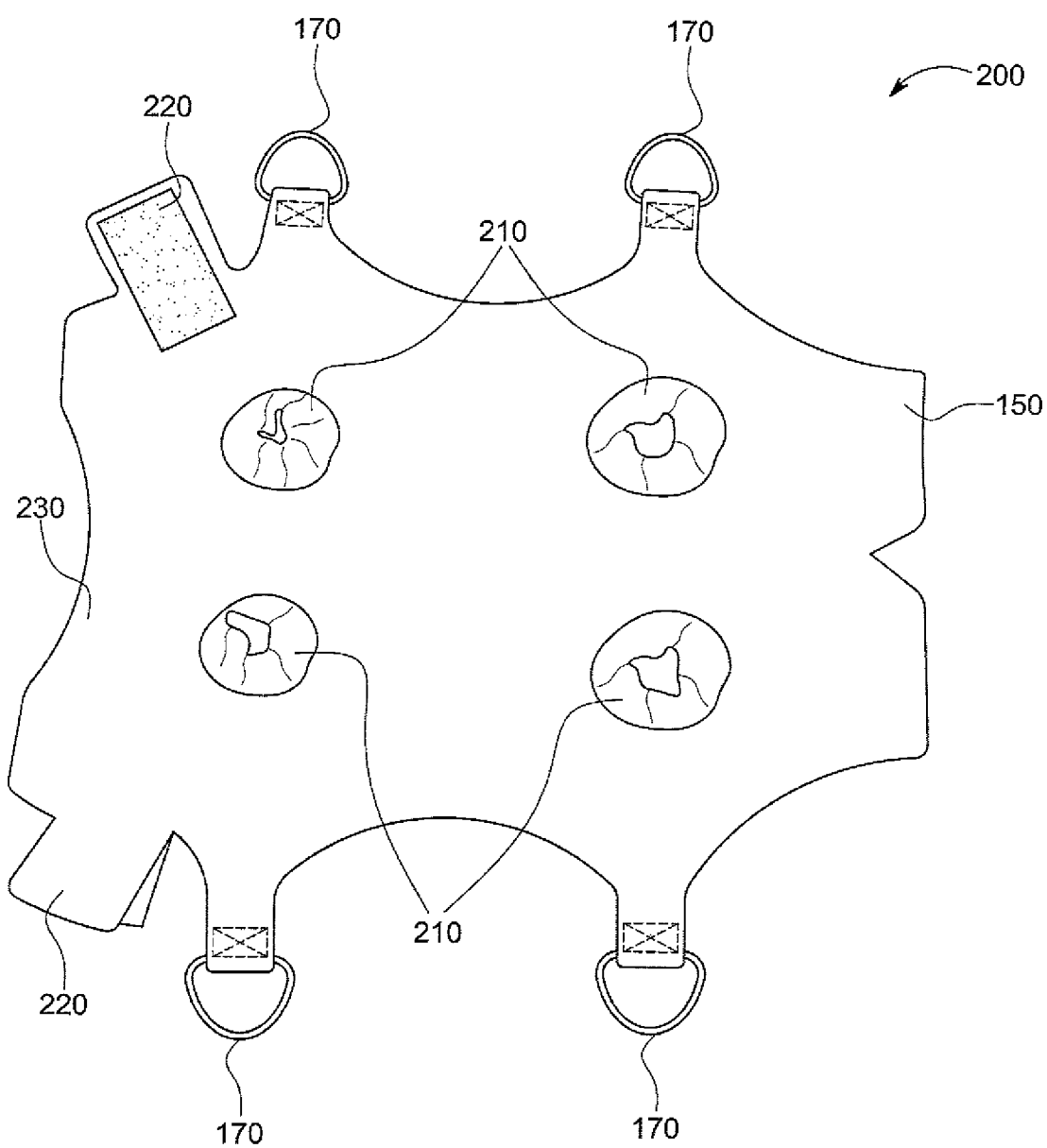
FIG. 2 is a view of an open harness interior according to an embodiment.

FIG. 2 is a close-up view of a harness assembly 200. The harness assembly 200 comprises a harness 150, attachment ring set 170, foot holes 210, and a neck strap 220. In an embodiment, the harness 150 is made of a sturdy comfortable material, such as leather, in a substantially rectangular structure, and may be shaped and sized in accordance to the shape and size of the animal.

In an embodiment, each of the foot-holes 210 are made of an elastic or stretchable material in order for the animal's legs to be inserted and removed easily and comfortably. In another embodiment, neck straps 220 protruding from the harness 150 may be used to provide greater restraint in the head and neck. The neck straps 220 may be made of the same material as the harness 150 with a fastening material attached such as a hook and loop fastening material (i.e. Velcro®).

Figure 3:
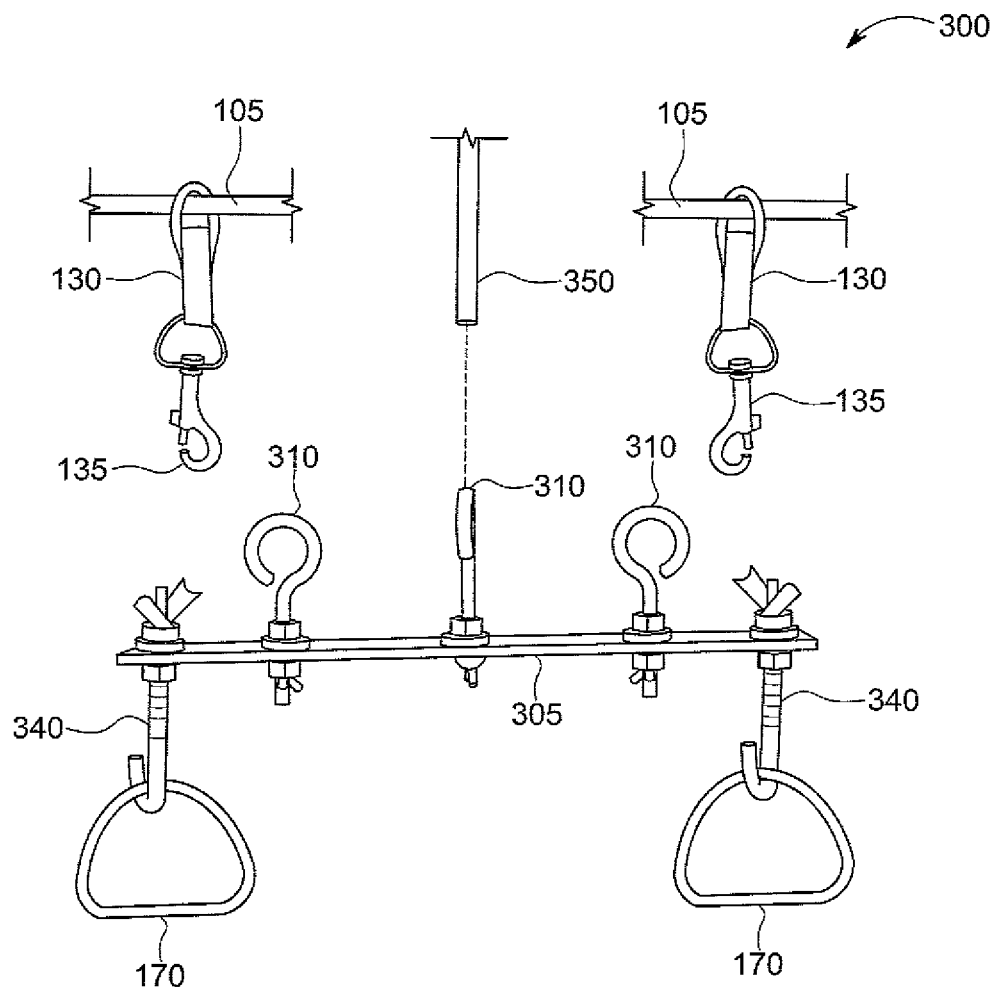
FIG. 3 is a close-up view illustrating a hooking bar and how some parts interact with the hooking bar according to an embodiment.

FIG. 3 is a diagram 300 depicting the hooking and hoisting components of the device 100. The hooking bar 140 contains an upper hook set comprising three upper hooks 310, one on each end of the bar and one in the bar center, and a lower hook set comprising two lower hooks 340, one on each end of the bar. The lower hook set attaches to the attachment ring set 170. Per FIG. 1A, the attachment ring set connect to the harness 150, or per FIG. 1B, the attachment ring set connect to the belt straps 160. Referring back to FIG. 3, the outer hooks of the upper hook set 310 attaches to the suspension straps 130 via the suspension strap clasps 135. The animal is hoisted to the suspension straps 130 by attaching the center hook of the upper hook set 310 to the hoist line 350 (from FIGS. 1A and 1B) via the hoist line clasp 335. Per FIGS. 1A and 1B, once the hoist line 330 is attached to the hooking bar 140, the lockable crank 180 is cranked, pulling the hoist line through the pulley 185, lifting or elevating the animal. The animal could also be lifted by hand to the suspension strap clasps 135 where it could be hooked in place. In an embodiment, the hoist line 330 lifts the animal only to the extent that the animal can walk with reduced pressure for rehabilitation.

Figure 4:
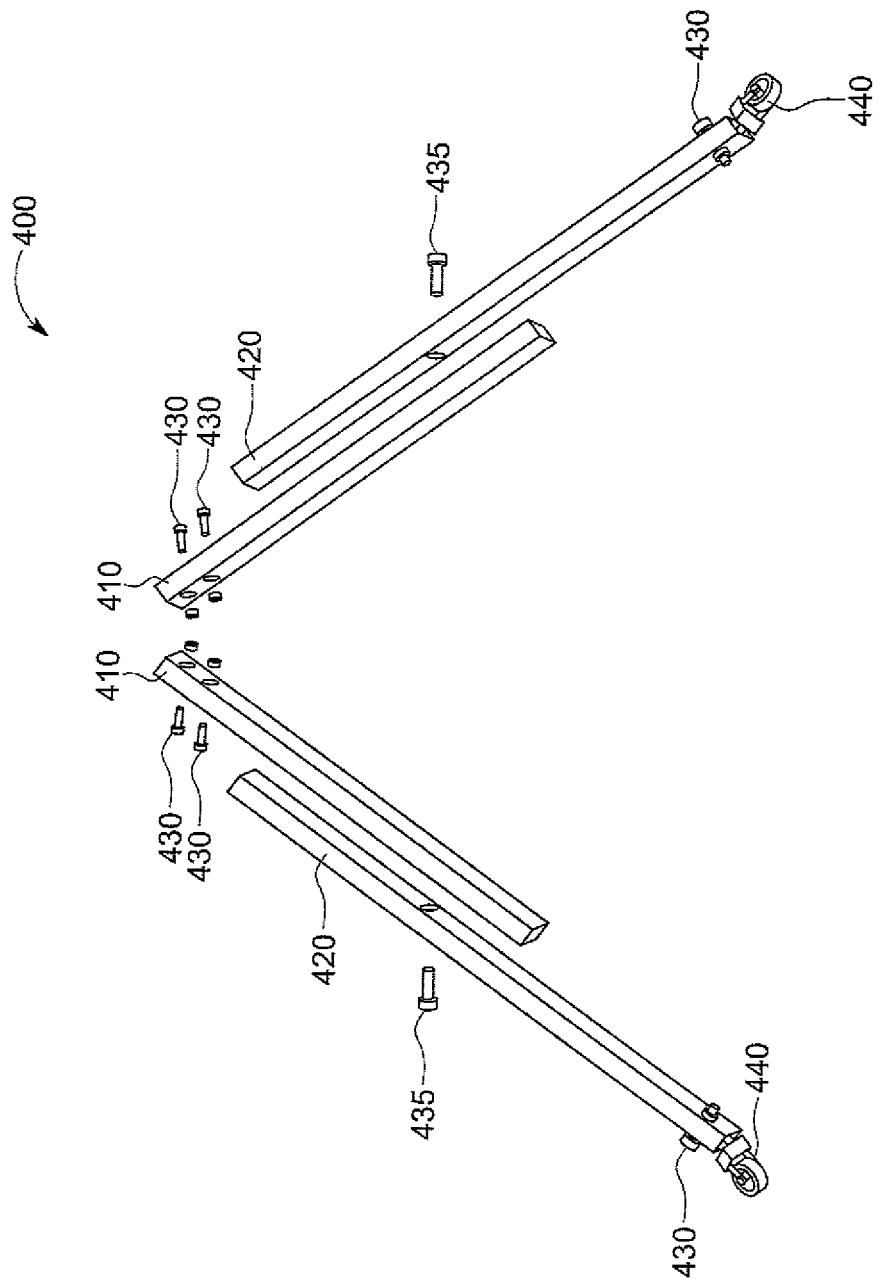
FIG. 4 is a view illustrating parts of the legs of the frame according to an embodiment.

FIG. 4 is an exemplary diagram of part of a kit 400 comprising upper legs 410, lower legs 420, bolts 430, hitch pins 435, and a wheel set 440. In an embodiment, the legs have an upper leg half 410 and a lower leg half 420, each one being hollow and sized so that one leg half can slide into the inside of the other leg half, each having holes wherein the hitch pins 435 can be inserted, securing the desired leg length.

Figure 5:
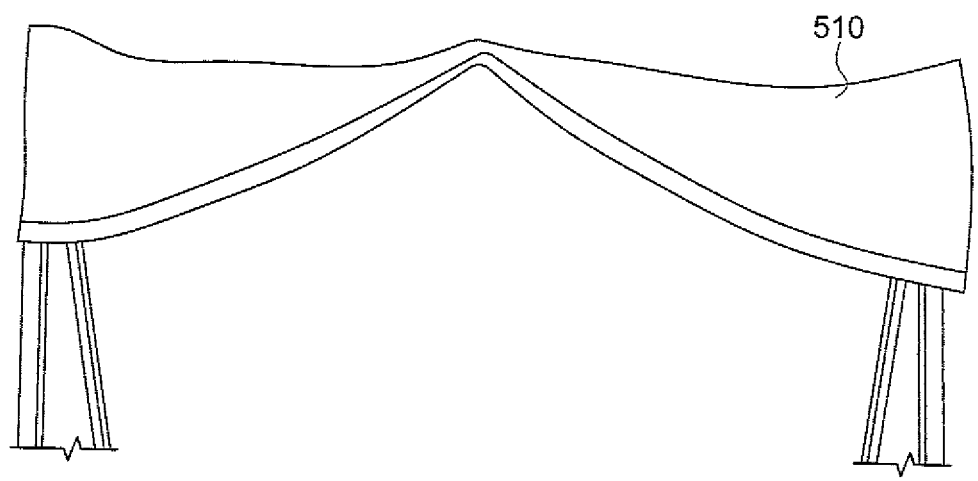
FIG. 5 is a side view of a canopy as it covers the top of the immobilization device according to an embodiment.

According to an embodiment, FIG. 5 shows a canopy 510 over the beam, providing a decorative concealment of the beam in addition to providing shade for the animal.

Figure 6:
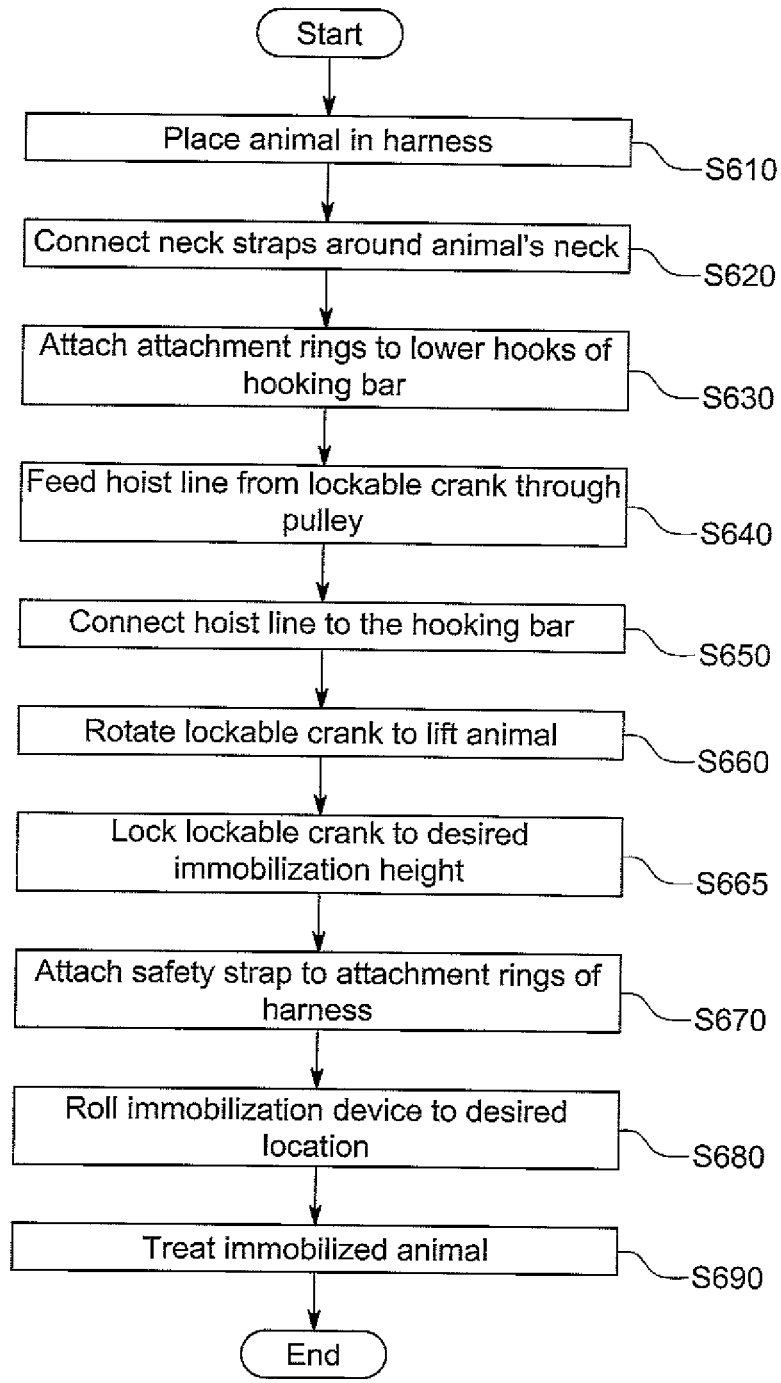
FIG. 6 is a flow chart of a method of using the immobilization device according to an embodiment.

FIG. 6 is a flowchart 600 describing a method for using the hoisting mechanism as part of the immobilization device 100 according to an embodiment. At S610 the animal is placed in its harness 150 while on a floor, table, or chair by inserting the animal's legs in the foot holes 210 of the harness 150. At S620, the two neck straps 220 of the harness 150 are connected to each other. In an embodiment, the neck straps 220 have Velcro® or other adhesive material sewed onto the harness material and are attached by laying the two straps 220 over each other to adhere.

At S630, the attachment ring set 170 are brought towards and attached to the lower hooks 340 of the hooking bar 140, the attachment ring set 170 hooking to the lower hook set 340. At S640, the hoist line 330, is fed from the lockable crank 180 through the pulley 185. At S650, the hoist line 330 is hooked with the hoist line clasp 335 to the middle hook of the upper hook set 310 on the hooking bar 140. Steps S610 thru S650 may be performed while the animal, harness 150, and hooking bar 160 remain at ground level to avoid heavy lifting.

At S660, the lockable crank 180 is rotated by turning the crank lever 183 to reel in the hoist line 330, thus elevating the animal. This step may alternatively be performed by a mechanical crank. At S665, the animal's position is locked in place by the lockable crank 180. At optional 667 (not shown), the animal is clasped securely into place by clasping the suspension strap clasps 135 from either the horizontal beam 105 or the perpendicular crossbeam 107 depending on the groomer's preference in the animal's orientation. In an optional S670, the set of safety straps 190 are extended from the legs 110 and attached to the attachment ring set 170 to create an extra layer of security for the animal in case the suspension straps 130 or belts 160 fail. At optional S680, the animal is transported to its desired location by rolling the immobilization device 100 using the wheels 440 at the bottom of each leg 110. At S690, the now immobilized animal is treated or groomed in accordance with the owner's wishes.

In an alternative method, the animal may be elevated to the set of suspension straps 130 by manually lifting up the animal. This may be performed with the attachment ring set 170 connecting to the suspension straps 130.

Exemplary uses for the immobilization device include, but is not limited to, cutting or trimming the animal's nails and fur/hair, administering medical treatment such as an injection or oral medication, aiding in an animal's rehabilitation by reducing pressure on the animal's limbs, winching people or animals out of holes or pits, and disciplining an animal by using the device 100 as a "time out."

The foregoing description comprises illustrative and exemplary embodiments of the present disclosure. It should be noted by those skilled in the art that the disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present disclosure is not limited to the specific embodiments illustrated herein, rather, embodiments are to be construed with references to the appended claims to provide the broadest possible interpretation of such claims in view of the prior art and effectively encompass the intended scope of the disclosure. Furthermore, unsubstantial modifications of the disclosed embodiments which are not presently foreseen may represent equivalents to the presently enabling, disclosed embodiments.

I claim:
1. An immobilization device comprising:
a beam comprising a first beam end and a second beam end, a beam midpoint, and a first angle bracket attachment point and a second angle bracket attachment point, the first angle bracket attachment point falling between the beam midpoint and the first beam end, and the second angle bracket attachment point falling between the beam midpoint and the second beam end,
a leg set assembly comprising a first leg set and a second leg set, each of the leg sets comprising:
two legs, a first one of the two legs in the first leg set and the second leg set being a front leg and a second one of the two legs in the first leg set and the second leg set being a back leg, each of the two legs of the first leg set and the second leg set having a top and a bottom,
the leg set assembly further comprising a first stabilization plate and a second stabilization plate each comprising a triangular structure that joins the two legs of a respective one of the first leg set and the second leg set at the respective tops and connects the respective tops to a respective one of the first beam end or the second beam end and the other of the first leg set or the second leg set to the other of the first beam end or the second beam end, and
the leg set assembly further comprising an angle bracket set comprising a first angle bracket and a second angle bracket, a respective one of the first angle bracket and the second angle bracket connecting a respective one of the stabilization plates of the first leg set and the second leg set to the respective first angle bracket attachment point or the respective second angle bracket attachment point,
a crossbeam, the crossbeam comprising two crossbeam ends and a crossbeam midpoint, the crossbeam attaching at the crossbeam midpoint to the beam at the beam midpoint,
a suspension strap set comprising a first suspension strap and a second suspension strap, a respective one of the suspension straps attaching to the beam on opposite sides of the beam midpoint, and a third suspension strap and a fourth suspension strap, a respective one of the third suspension strap and the fourth suspension strap attaching to the crossbeam on opposite sides of the crossbeam midpoint, and a suspension strap clasp at an end of each of the suspension straps that is distal with respect to the crossbeam.

2. The immobilization device of claim 1, further comprising a hoisting apparatus, the hoisting apparatus comprising:
   a cranking mechanism, the cranking mechanism comprising,
      a lockable crank, the lockable crank attached to the first angle bracket,
      a pulley, the pulley attached to the beam at the beam midpoint,
      a hoist line comprising a first line end and a second line end, the hoist line being in communication with the pulley and connecting to the lockable crank via the first line end, and
      a hoist hook, the hoist hook attaching to the hoist line via the second line end,
   the hoisting apparatus further comprising a hooking bar, the hooking bar comprising,
      a bar, comprising an underside, a top side, two ends, and a midpoint,
      a lower hook set, the lower hooks set comprising a first lower hook and a second lower hook, a respective one of the lower hooks attaching to the underside proximate a respective one of the two ends on each side of the midpoint of the bar,
      an upper hook set comprising a first upper hook and a second upper hook each attaching to the top side of the bar, a respective one of the first upper hook and the second upper hook being attached on each side of the midpoint of the bar for attaching to the first suspension strap and the second suspension strap, and
      a center hook, the center book attaching to the top side at the midpoint of the bar for attaching to the hoist hook.

3. The immobilization device of claim 2, further comprising a harness, the harness comprising:
   a substantially rectangular structure with four corners and,
   four holes situated in the substantially rectangular structure for the insertion of a leg of a four-legged animal,
   a front end and a back end,
   a first side and a second side, and
   an attachment ring set comprising four rings, a respective one of the four rings attached to a respective one of the corners of the substantially rectangular structure, the four rings configured to connect to the lower hook set of the hooking bar.

4. The immobilization device of claim 3, wherein the attachment ring set connects the harness directly to the suspension strap set.

5. The immobilization device of claim 2, further comprising a suspension belt set, the suspension belt set comprising:
   a first suspension belt and a second suspension belt, a respective one of the suspension belts attaching to a respective one of the lower hooks, and
   an attachment ring set comprising at least two rings, a respective one of the rings attached to a respective one of the suspension belts to connect to the lower hook set of the hooking bar.

6. The immobilization device of claim 1, further comprising a height adjustment means to change the length of the leg sets.

7. The immobilization device of claim 1, further comprising a canopy, the canopy covering the beam and the crossbeam.

8. The immobilization device of claim 1, further comprising a wheel set, the wheel set comprising at least four wheels where a respective one of the wheels attaches to a respective one of the bottoms of a respective one of the legs in the leg sets.

9. The immobilization device of claim 1, further comprising a safety strap set, the safety strap set comprising at least two safety straps, a respective one of the safety straps extending from a respective one of the legs.

\* \* \* \* \*